United States Patent
Manroa et al.

(10) Patent No.: US 8,036,651 B1
(45) Date of Patent: Oct. 11, 2011

(54) SYSTEMS AND METHODS FOR ENFORCING CALL RESTRICTIONS BETWEEN DOMAINS

(75) Inventors: Arun Manroa, Herndon, VA (US); Manish Sharma, Fairfax, VA (US)

(73) Assignee: Nextel Communications Inc., Reston, VA (US)

(*) Notice: Subject to any disclaimer, the term of this patent is extended or adjusted under 35 U.S.C. 154(b) by 565 days.

(21) Appl. No.: 11/436,762

(22) Filed: May 19, 2006

(51) Int. Cl.
*H04W 4/00* (2009.01)
*H04W 24/00* (2009.01)

(52) U.S. Cl. ............ 455/422.1; 455/456.4; 455/417; 455/565; 370/310; 370/328

(58) Field of Classification Search ........ 455/422.1, 455/456.1–457, 417, 418–419, 565; 370/310, 370/328
See application file for complete search history.

(56) References Cited

U.S. PATENT DOCUMENTS

| | | | | |
|---|---|---|---|---|
| 5,933,784 A * | 8/1999 | Gallagher et al. | ......... | 455/552.1 |
| 6,496,703 B1 * | 12/2002 | da Silva | ............ | 455/456.4 |
| 6,823,190 B2 * | 11/2004 | Ford et al. | ............ | 455/456.3 |
| 6,937,859 B2 * | 8/2005 | Hasegawa et al. | ......... | 455/433 |
| 7,424,541 B2 * | 9/2008 | Bourne | ................. | 709/227 |
| 2005/0227713 A1 * | 10/2005 | Bates et al. | ............. | 455/456.4 |

\* cited by examiner

*Primary Examiner* — George Eng
*Assistant Examiner* — Marcos Torres

(57) ABSTRACT

Systems and methods for enforcing calling restrictions are provided. When a first and second communication station are located in different domains, calling restrictions for a first communication station can be based on a current geographic location of the second communication station. The calling restrictions can be enforced independent of an address/identifier of the first or second communication station. The calling restrictions can be based on the current geographic locations of the first and second communication stations and the allowed geographic area of the first communication station.

16 Claims, 5 Drawing Sheets

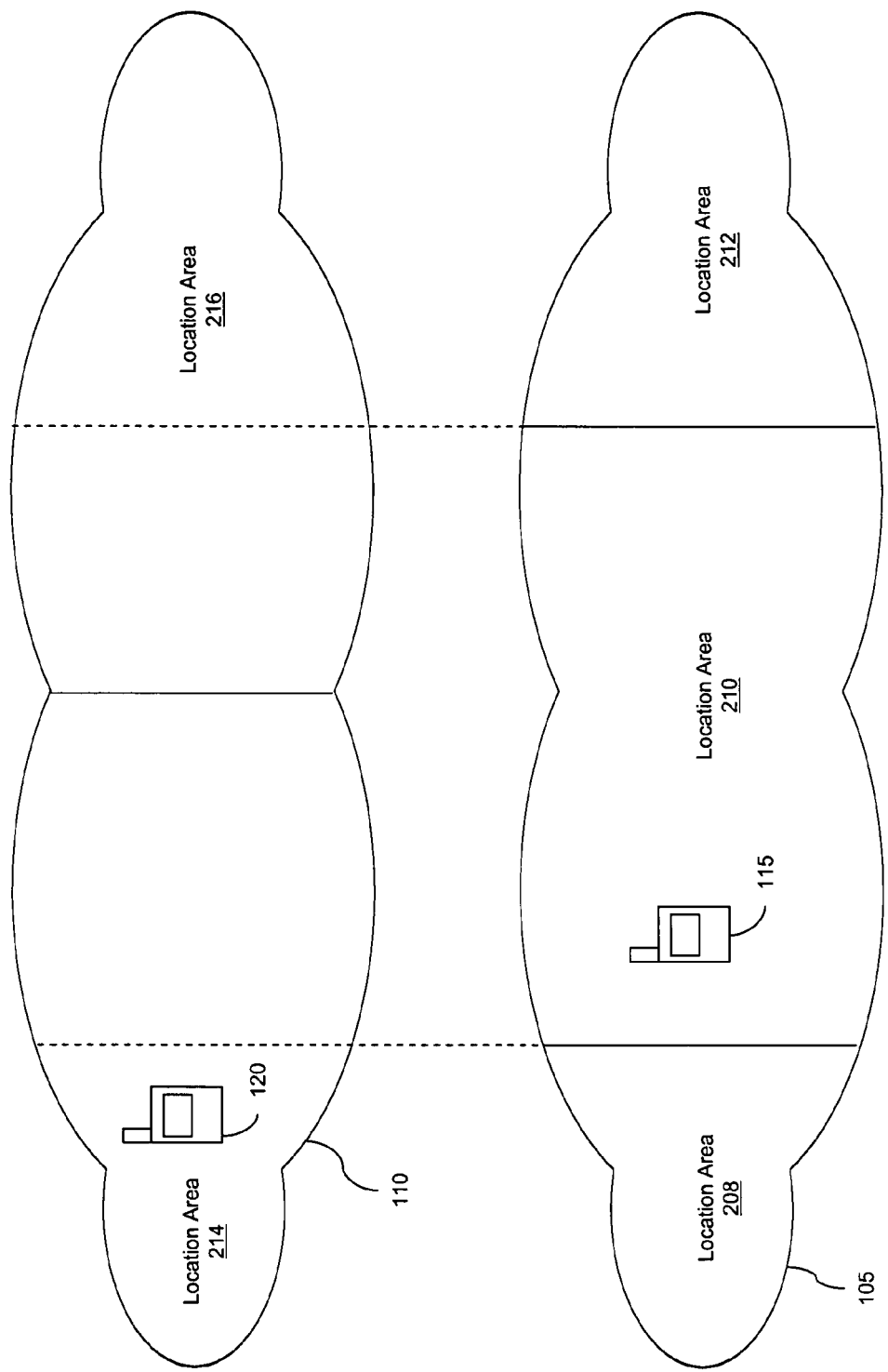

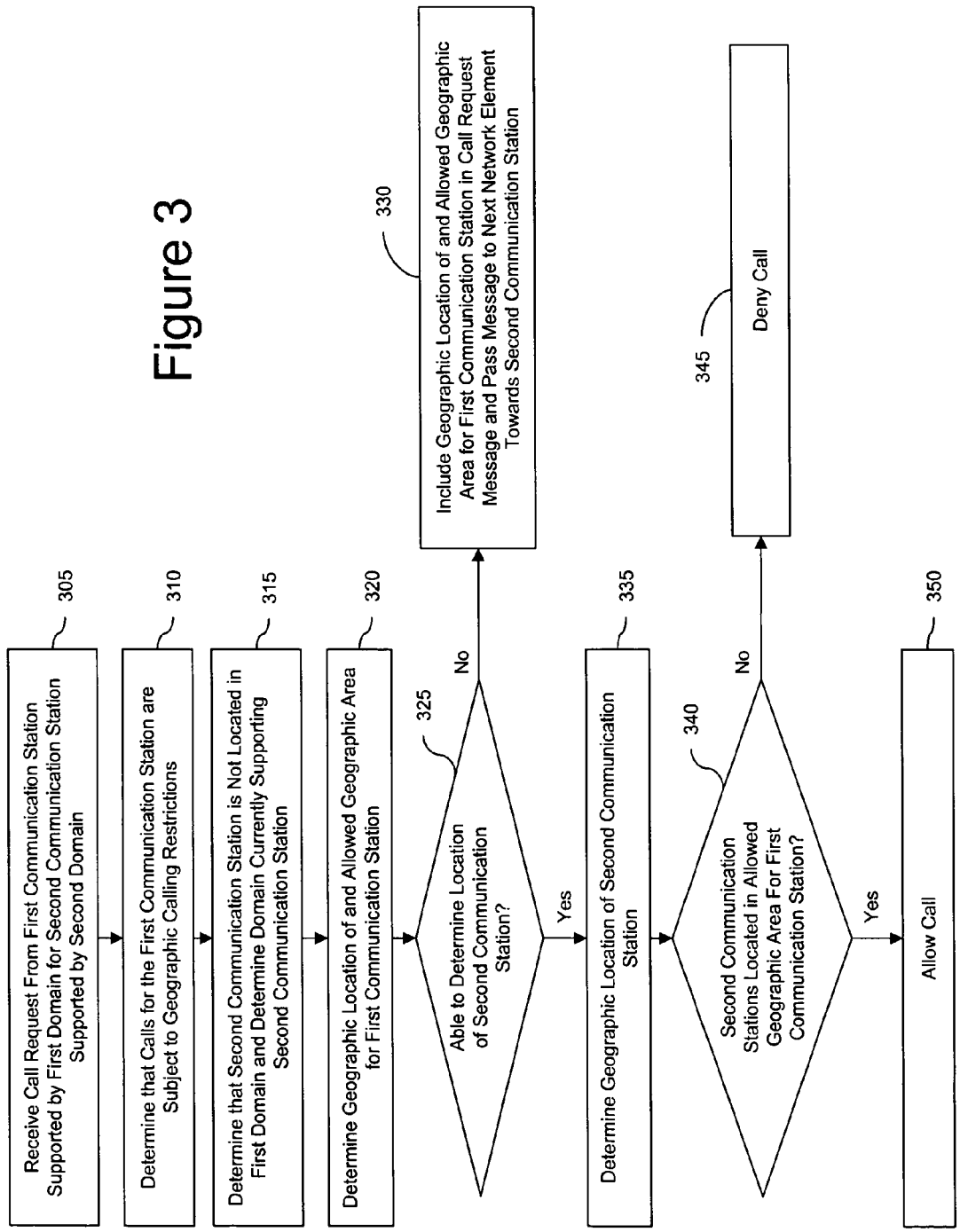

SYSTEMS AND METHODS FOR ENFORCING CALL RESTRICTIONS BETWEEN DOMAINS

BACKGROUND OF THE INVENTION

Communication network operators enforce a variety of calling restrictions on subscribers. One of the most common calling restrictions is to limit a caller to initiating only local calls because communication network operators typically incur additional fees to carry non-local calls. Subscribers that do not wish to incur additional fees for such calls can have their account restricted from making long distance calls.

Conventional systems enforce these long distance calling restrictions based on some portion of the calling and called party's numbers. Calls in which the calling and called party numbers have different area codes are typically restricted based on this difference in area codes. Some calls made within the same area code are not considered local calls, and incur additional fees. These types of calls can be restricted based upon the local exchanges of the calling and called party's numbers (i.e., the first three digits of XXX-XXXX).

SUMMARY OF THE INVENTION

Although restricting calls based on the calling and called party's numbers may be appropriate for wireline communication networks, this technique may not adequately address issues faced by wireless network operators. For example, assume that a wireless communication station has a telephone number associated with a first geographic area. When this wireless communication station is located in a second geographical area and initiates a call to a second wireless communication station located in the second geographical area, conventional communication networks would treat this call as a long-distance call. This call treatment would occur even if the two wireless communication stations are located within a few feet of each other. Accordingly, the present invention enforces calling restrictions based on the geographic location of the called party, and in some embodiments also based on the current geographic location of the calling party.

An additional difficulty arises when attempting to enforce the inventive geographic calling restrictions when the calling and called parties are located in different networks. When call restrictions are based on the telephone numbers of the calling and called parties, and when these parties are located in different networks, the calling restrictions can easily be enforced because the originating network has all of the information necessary for enforcing the restrictions (i.e., the calling and called party's telephone numbers). When implementing the inventive geographic-based calling restrictions between calling and called parties located in different networks, the originating network may not have the ability to determine the current geographic location of the called party. Accordingly, exemplary embodiments of the present invention provide a number of different systems and methods for obtaining the called party's current geographic location and enforcing the calling party's call restrictions.

Other objects, advantages and novel features of the present invention will become apparent from the following detailed description of the invention when considered in conjunction with the accompanying drawings.

BRIEF DESCRIPTION OF THE DRAWING FIGURES

FIGS. 2a-2c are block diagrams illustrating exemplary systems in accordance with the present invention; and FIG. 3 is a flow diagram of an exemplary method in accordance with the present invention.

DETAILED DESCRIPTION OF THE PREFERRED EMBODIMENTS

Figure 1:
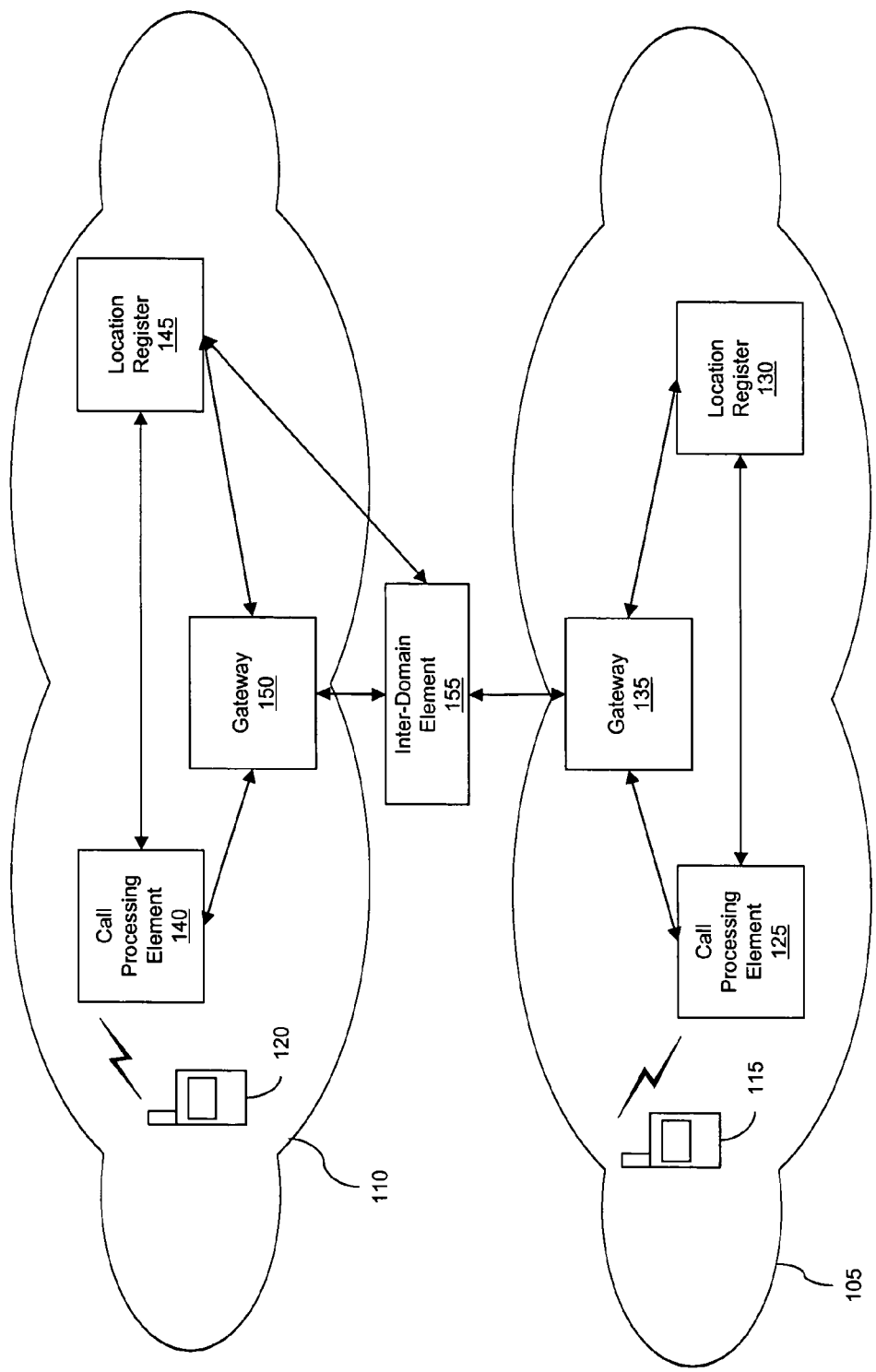
FIG. 1 is a block diagram illustrating an exemplary system in accordance with the present invention.

FIG. 1 is a block diagram illustrating an exemplary system in accordance with the present invention. The system includes domains 105 and 110, which have at least some overlap in geographical coverage. The domains may be under the administrative jurisdiction of a single entity or they may be controlled by different administrative entities. Domains 105 and 110 can be different networks, different portions of the same network and/or different portions of different networks. Domain 105 supports communication station 115 and domain 110 supports communication station 120. Domain 105 includes call processing element 125 coupled to location register 130 and gateway 135. Domain 110 includes call processing element 140 coupled to location register 145 and gateway 150. Inter-domain element 155 couples domains 105 and 110 via gateways 135 and 150.

Communication domains 105 and 110 can operate as any type of communication network, such as an iDEN network, QChat network, CDMA-based network, TDMA-based network, OFDM-based network (e.g., a WiFi- or WiMax-based network) and/or the like. Communication stations 115 and 120 can be any type of communication stations including a wireless telephone, personal digital assistant and/or the like. These communication stations can be arranged to conduct interconnect voice, dispatch voice and/or data communications. The dispatch communications can include push-to-talk, instant messaging or any other type of dispatch communications. The data communications can include voice over internet protocol (VoIP), electronic mail, paging, short messaging service (SMS), multimedia messaging service (MMS), peer-to-peer communications, application to person communication, application to application communications or any other data sharing type of communications.

Call processing elements 125 and 140 can be any type of call processing element including, but not limited to, a dispatch server and/or mobile switching center. Location registers 130 and 145 can be any type of location registers including, but not limited to, home location registers and/or visitor location registers. Although FIG. 1 illustrates call processing elements as distinct from the location registers, they can be a single network element, such as a mobile switching center/visitor location register (MSC/VLR). Gateways 135 and 150 can be any type of gateway for handling calls between different domains or networks, and can, in some embodiments, perform signaling and media protocol conversion, in which case inter-domain element 155 may be omitted. Inter-domain element 155 can perform signaling and media protocol conversion between domains 105 and 110. Although FIG. 1 illustrates inter-domain element 155 as being coupled to only two domains, this element can be coupled to more than two domains. Although FIG. 1 illustrates a single gateway for domain 105, the domain can include more than one gateway, such as a separate gateway for each external domain.

Figure 2A:
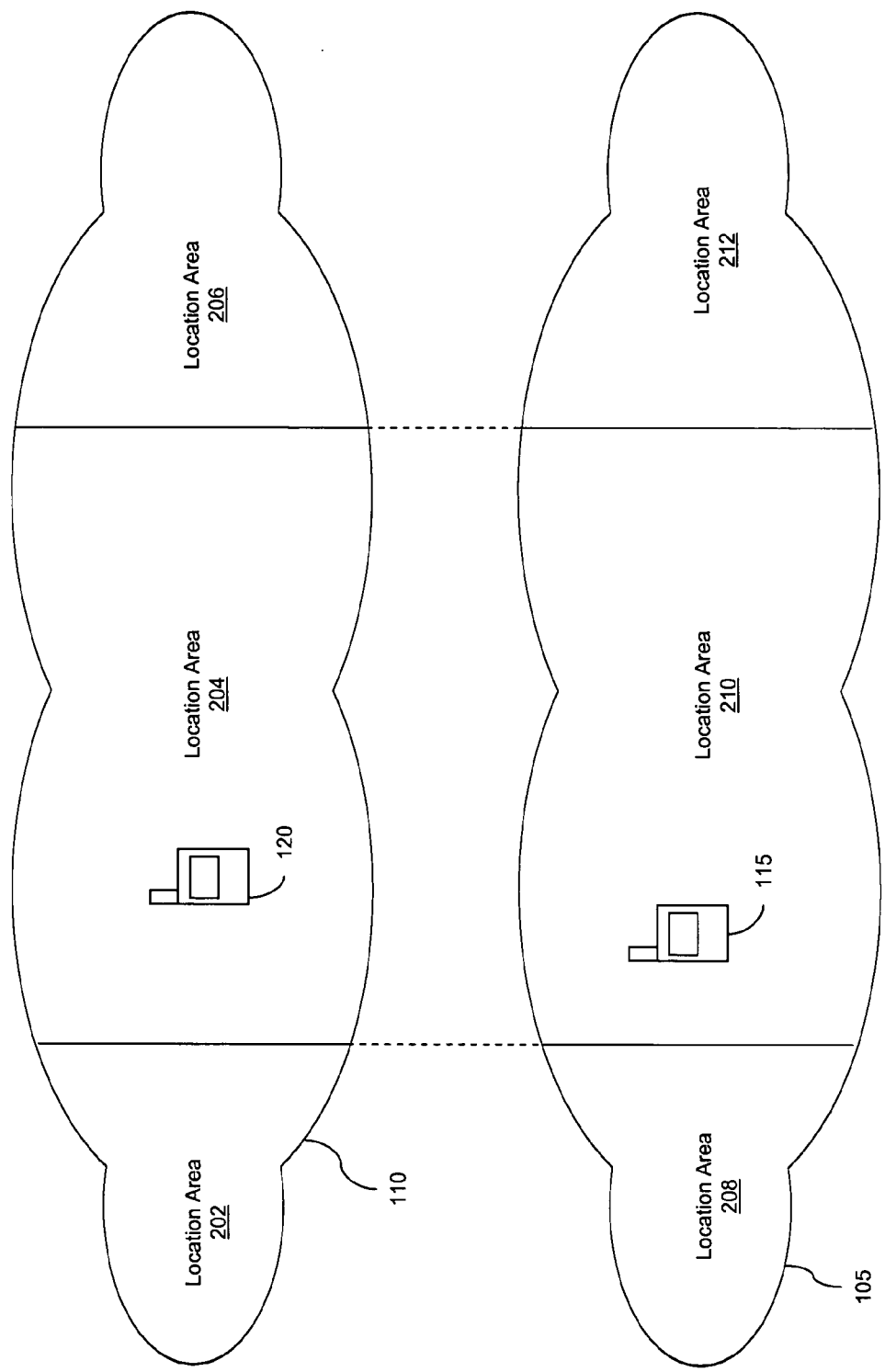
Figure 2B:
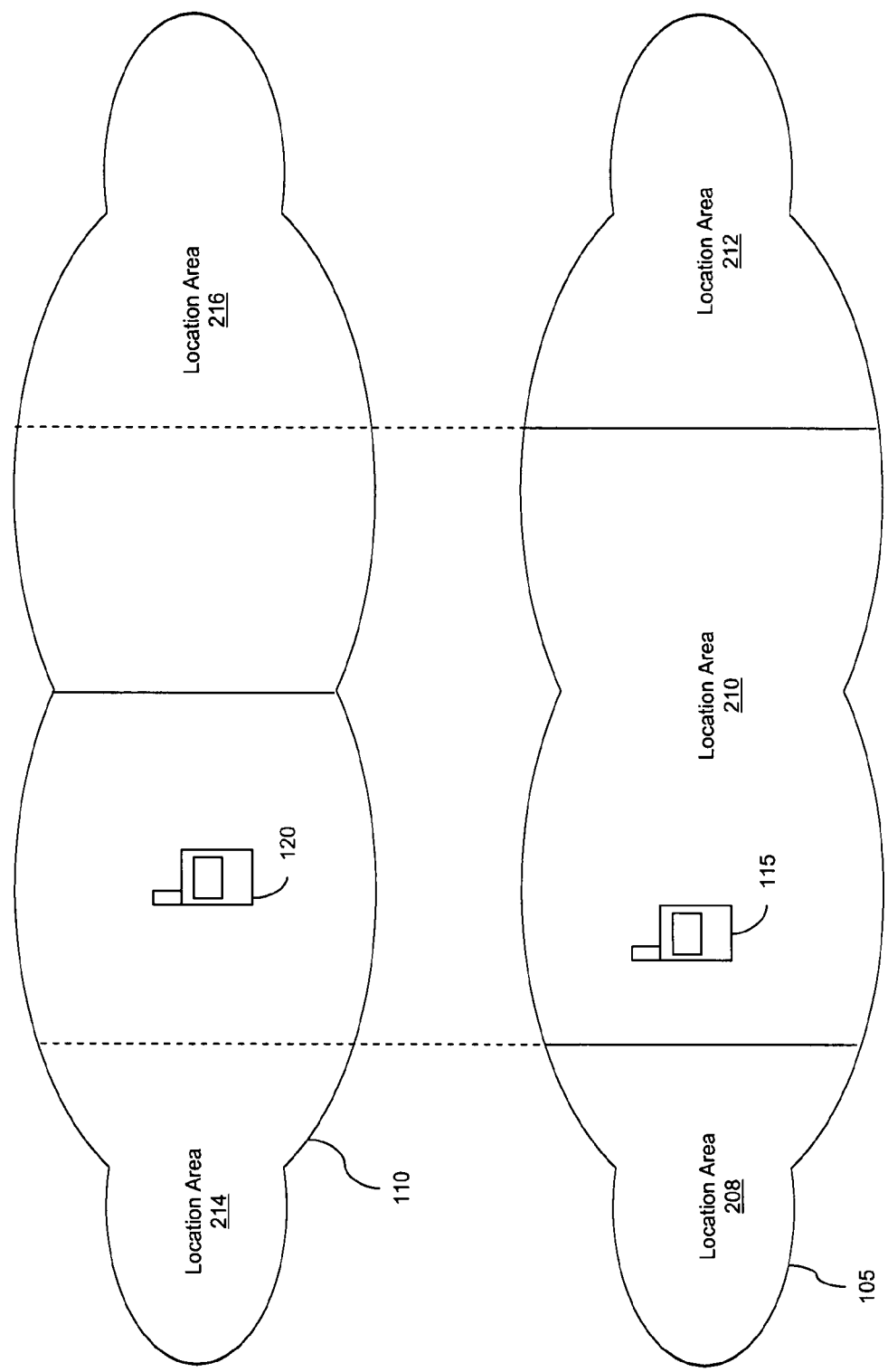

FIGS. 2a-2c are block diagrams illustrating exemplary systems in accordance with the present invention. For ease of explanation and not limitation, the various network elements of FIG. 1 are not illustrated in FIGS. 2a-2c. The calling location areas illustrated in FIGS. 2a-2c can correspond to any type of geographic area, including, but not limited to, a town, city, county, state or the like. Additionally, the location areas can have arbitrary geographic areas not tied to particular governmentally defined areas and/or these location areas need not necessarily be contiguous. In the examples described below in connection with FIGS. 2a-2c, the call restriction is based solely on the callers current geographic location and the allowed geographic area defined by the originating domain. However, more or less factors can be employed for assessing calling restrictions.

In the system illustrated in FIG. 2a domains 105 and 110 each include three calling location areas, which have the same geographic boundaries. Assume that communication station 115 is calling communication station 120, and that location area 210 defines the allowed geographic area for communication station 115. Because communication station 120 is located within the allowed geographic area for communication station 110 the call should not be restricted. Assume now that location area 208 is the "home" location area for communication station 115, which is roaming in location area 210. If communication station 115 is not restricted from initiating calls while roaming and if location area 210 is included in the allowed geographic area of communication station 115, the call will not be restricted because communication station 120 is located in the allowed geographic area for communication station 115. In this example, the call would not be restricted even if the calling numbers of communication stations 115 and 120 had different area codes or other regional identifiers of their calling numbers.

Referring now to FIGS. 2b and 2c, domains 105 and 110 have location areas with different geographic boundaries and location area 210 defines the allowed geographic area for communication station 115. Domain 105 includes three location areas 208, 210 and 212 (delineated by solid lines), and domain 110 includes two location areas 214 and 216 (delineated by solid lines). The dashed lines in FIGS. 2b and 2c illustrate how the boundaries of the location areas of domain 105 correspond to the location areas of domain 110. Referring now to FIG. 2b, when communication station 115 initiates a call to communication station 120, the call will not be restricted because communication station 120 is located in the allowed geographic area for communication station 115 (as defined by location area 210 of domain 105). In the system illustrated in FIG. 2c, however, the call from communication station 115 to communication station 120 will be restricted because communication station 120 is not located in the allowed geographic area for communication station 115 (as defined by location area 210 of domain 105). This call is restricted even though communication station 120 is in the same location area of domain 110 (i.e., location area 214) in both FIGS. 2b and 2c.

FIG. 3 is a flow diagram of an exemplary method in accordance with the present invention. The method of FIG. 3 can be performed by a number of different elements in the system of FIG. 1, and this method will be initially described in connection with gateway 135. When gateway 135 receives a call request from communication station 115 for communication station 120 (step 305), the gateway determines that calls for communication station 115 are subject to geographic calling restrictions (step 310). Gateway 135 can determine whether communication station 115 is subject to geographic calling restrictions based on an indication in the call request message or by accessing location register 130. Gateway 135 also determines that communication station 120 is not located in domain 105 and the domain in which the communication station is located (step 315). The domain determination can be based on the calling number of communication station 120. Because the communication station 120 can be a mobile station, the called number of communication station 120 only indicates its administrative domain, and not necessarily its current geographic area.

Gateway 135 then determines the current geographic location of and the allowed geographic area for communication station 115 (step 320). The current geographic location of communication station 115 can be provided to gateway 135 as a Global Positioning Satellite (GPS) location or merely a calling location area (e.g., geographical boundaries), included in the call setup message or from information obtained from location register 130. The allowed geographic area for communication station 115 can be included in the call setup message or from information obtained from location register 130.

Gateway 135 then determines whether it is able to determine the geographic location of communication station 120 (step 325). Gateway 135 can determine the location of communication station 120 by accessing inter-domain element 155, gateway 150, call processing element 140 or location register 145. However, when gateway 135 is not be able to determine the geographic location of communication station 120 ("No" path out of decision step 325), the gateway includes the geographic location of and the allowed geographic area for communication station 115 in the call request message, and passes the message to the next network element towards communication station 120 (step 330). Steps 325 and 330 will be performed by the next network element towards communication station 120 until one of the network elements has the ability to determine the geographic location of the second communication station.

When gateway 135 is able to determine the geographic location of communication station 120 ("Yes" path out of decision step 325), then gateway 135 determines the geographic location of communication station 120 (step 335). When a network element other than gateway 135 has the ability to determine the location of communication station 120, that network element will perform the acts of step 335. Gateway 135 then determines whether communication station 120 is currently located in an allowed geographic area for communication station 115 (step 340). When communication station 120 is not located in an allowed geographic area for communication station 115 ("No" path out of decision step 340), then the call is denied (step 345). If, however, communication station 120 is located in an allowed geographic area for communication station 115 ("Yes" path out of decision step 340), then the call is allowed to proceed (step 350).

Which one of the particular network elements that performs the method of FIG. 3 depends upon access to location information of the called communication station. Accordingly, whichever network element of gateways 135 and 150, inter-domain element 155 or call processing element 140 has access to location information for communication station 120 can perform this method to enforce the calling restrictions. In some embodiments messages may need to be converted by gateway 135, inter-domain element 155 and/or gateway 150. In addition, a combination of different network elements can perform the method of FIG. 3 to enforce the calling restrictions. Depending upon implementation, the call request can include the calling communication station's calling restrictions. The calling restrictions can include the current geographic location of and the allowed geographic areas for the calling communication station.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for enforcing call restrictions, the method comprising the acts of:
   receiving a call request from a first communication station supported by a first domain for a second communication station supported by a second domain;
   converting the call request from a format of the first domain into a format of the second domain;
   determining at a first network element that the first communication station is subject to calling restrictions wherein the call request is allowed or denied according to the geographic location of the second communication station;
   receiving the geographic location of the second communication station at the first network element when the first network element can determine the geographic location of the second communication station, and sending a message from the first network element to a second network element to determine the geographic location of the second communication station when the first network element cannot determine the geographic location of the second communication station; and
   allowing the call by the first network element when the first network element can determine the geographic location of the second communication station and by the second network element when the second network element can determine the geographic location of the second communication station when the second communication station is located in a geographic area which is not restricted according to the calling restrictions of the first communication station.

2. The method of claim 1, wherein it is determined that the second communication station is supported by the second domain based on an identifier of the second communication station.

3. The method of claim 1, wherein the call request is for a dispatch voice call, interconnect voice call or data call.

4. The method of claim 1, wherein the first network element is a gateway of the first domain.

5. The method of claim 1, wherein the first and second network elements are network elements coupled between the first and second domains.

6. The method of claim 1, wherein the second network element is a gateway of the second domain.

7. The method of claim 1, wherein the second network element is a call processing element of the second domain.

8. A method for enforcing call restrictions, the method comprising the acts of:
   receiving a call request at a first network element from a first communication station supported by a first domain for a second communication station supported by a second domain;
   converting the call request from a format of the first domain into a format of the second domain;
   determining an allowed geographic area for the first communication station at the first network element;
   determining a current geographic location of the second communication station at the first network element or a second network element, wherein when the first network element cannot determine the geographic location of the second communication station the first network element sends a message to the second network element to determine the geographic location of the second communication station; and
   denying the call request by the first network element when the first network element can determine the geographic location of the second communication station and by the second network element when the second network element can determine the geographic location of the second communication station when the current geographic location of the second communication station is not within the allowed geographic area for the first communication station.

9. The method of claim 8, wherein the call request includes a calling restriction for the first communication station.

10. The method of claim 9, wherein the calling restriction identifies the allowed geographic area for the first communication station.

11. The method of claim 8, wherein a determination that the second communication station is supported by the second domain is based on an identifier of the second communication station.

12. The method of claim 8, wherein the call request is for a dispatch voice call, interconnect voice call or data call.

13. The method of claim 8, wherein the first network element is a gateway of the first domain.

14. The method of claim 8, wherein the first and second network elements are network elements coupled between the first and second domains.

15. The method of claim 8, wherein the second network elements is a gateway of the second domain.

16. The method of claim 8, wherein the second network element is a call processing element of the second domain.

* * * * *